Figure 1:
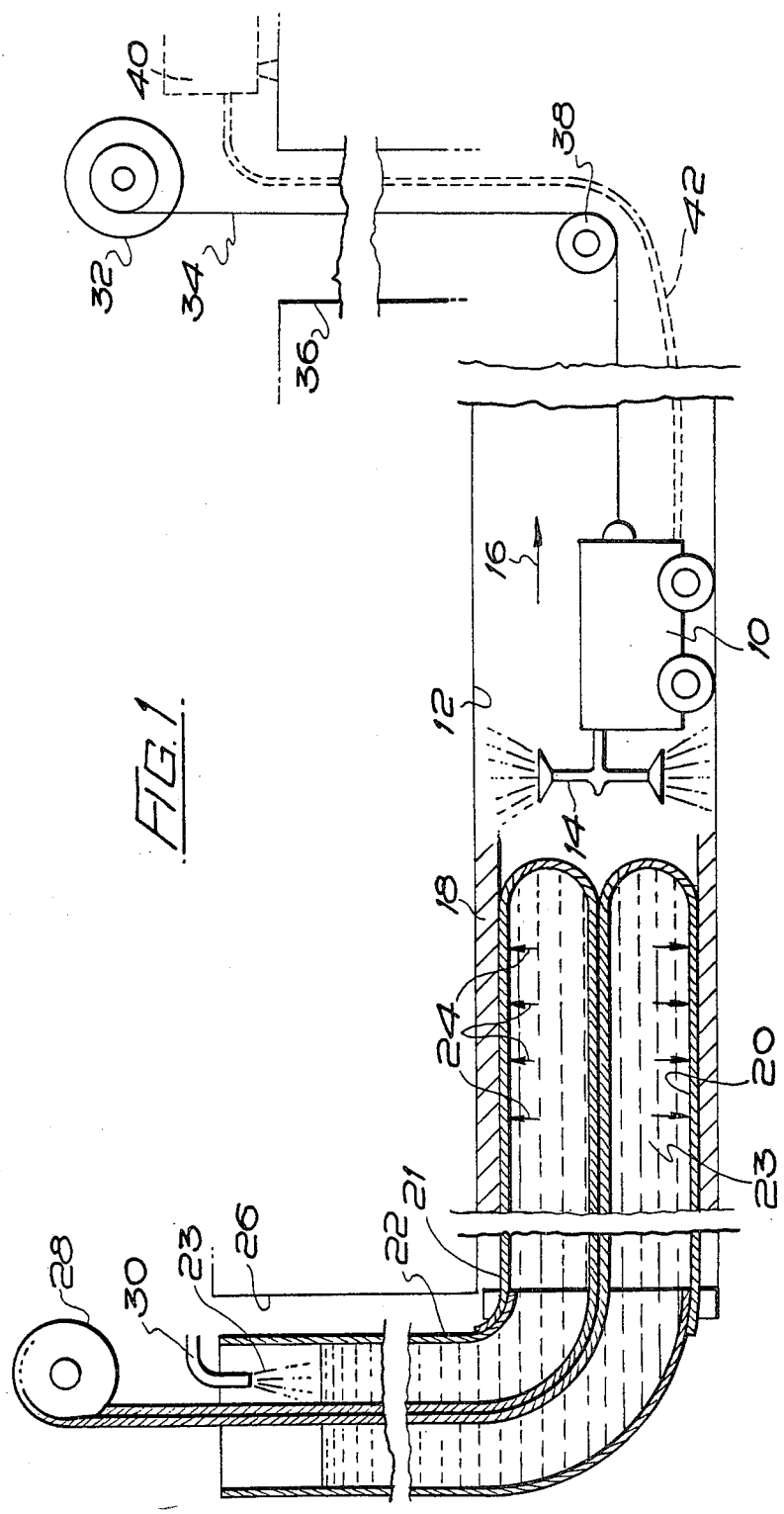

United States Patent [19]

Wood

[11] 4,401,696
[45] Aug. 30, 1983

[54] LINING OF PIPELINES AND PASSAGEWAYS

[75] Inventor: Eric Wood, Wellingborough, England

[73] Assignee: Insituform International, Inc., Monrovia, Liberia

[21] Appl. No.: 307,102

[22] Filed: Sep. 30, 1981

[51] Int. Cl.³ .................. B05D 7/22; B05D 1/02; B05D 3/12
[52] U.S. Cl. .................. 427/236; 156/242; 427/146; 427/238
[58] Field of Search .................. 427/140, 236, 238; 156/242

[56] References Cited

FOREIGN PATENT DOCUMENTS 1230776  5/1971  United Kingdom ............ 427/238

Primary Examiner—James R. Hoffman
Attorney, Agent, or Firm—Fred Philpitt

[57] ABSTRACT

A method of lining a passageway, such as an undergound sewer is disclosed. A fluent but thixotropic cementitious composition is sprayed onto the surface of the passageway, to form a lining of predetermined thickness and before the material has had time to flow to change its distribution on the surface, a flexible tube is everted onto the applied material, holding it in position until it is sufficiently cured.

7 Claims, 3 Drawing Figures

LINING OF PIPELINES AND PASSAGEWAYS

This invention relates to the lining of pipelines and has as its object to provide a lining in a pipeline or passageway which will have the effect of repairing the pipeline or passageway, or rendering it more suitable for carrying a liquid or material for which it would otherwise be unsuitable.

The invention seeks to provide a rigid lining which in effect will be a pipe within a pipe.

The method of the invention provides a simple and effective means for the formation of the lining.

We have already disclosed and invented a method for forming a lining in a pipe, and that method involves the impregnating of a felt material with a curable resin, and then shaping the felt material to the surface of the pipeline or passageway, allowing or causing the resin to cure, whereby a rigid resin lining, with felt embedded therein, is formed.

In a particular example, the lining is formed from a tube of a laminated material including an outer skin and an inner layer of felt material. Inside this laminate is inserted the synthetic resin, and the tubular laminate is everted into the pipeline or passageway, so that the wet resin impregnated felt surface is presented to the passageway. It is shaped to the passageway contour by means of fluid pressure.

The prior method has proved itself to be extremely suitable and effective, and the present invention relates to an alternative lining method.

It has been found in some cases, that it is desirable to provide a cementitious lining, without any absorbent felt and a feature of the above lining process presents an extremely suitable compliment to such a cementitious lining.

In accordance with one aspect of the present invention, a pipeline or passageway, especially a large underground passageway such as a sewer, is lined by means of a hardenable cementitious composition which is sprayed on to the sewer surface by means of a spraying apparatus which is moved along the sewer, and the layer of material spread on to the surface is held in position until it cures or hardens by everting a flexible tubular membrane along the passageway behind the spraying apparatus.

In the method of the invention, no absorbent material is used, and the composition may be a curable resin, containing aggregate or it may be a cement-mortar, but in either event the flexible membrane holds the layer of the material, which is obviously fluent when applied, until it sets forming a rigid lining. The composition may include reinforcing fibres for strength and to render the composition stiffer or more thixotropic.

The flexible tubular membrane may be a film or plastics material, and may be everted into the passageway behind the spraying apparatus or slug by means of air pressure, or alternatively a liquid may be used.

When the composition cures to form the hard lining, the membrane may be stripped therefrom or it may remain with the hardened composition depending upon the material to be used for said composition.

The spraying apparatus when used may be any suitable, and may include a rotary head which spins as the spraying apparatus progresses along the pipeline or passageway, in order to ensure an even layering of the fluent composition on the passageway or pipeline wall.

Figure 2:
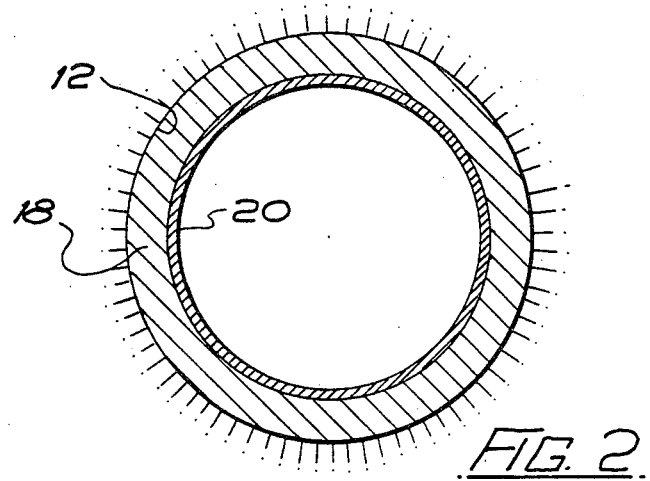
Figure 3:
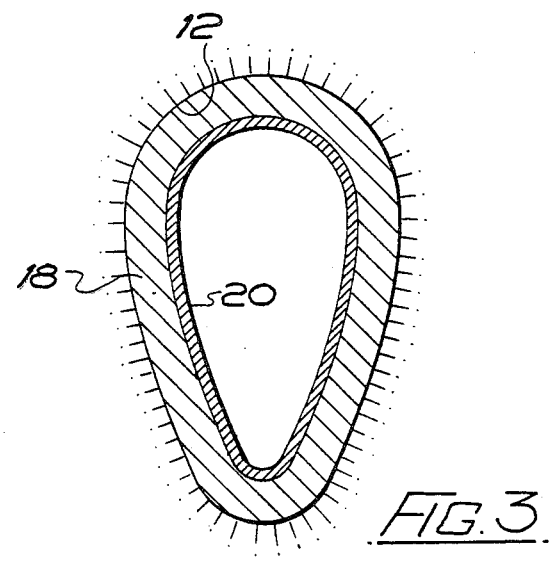

An embodiment of the present invention will now be described, by way of example, with reference to the accompanying diagrammatic drawings of which:

FIG. 1 shows, in sectional elevation, a sewer which is being lined in accordance with the method of the embodiment of the invention; and FIGS. 2 and 3 respectively show two different forms of sewer profile after lining of same in accordance with the method of the embodiment of the present invention.

Referring to the drawings, the method involves the utilisation of a spraying apparatus 10 which in this example is pulled along the inside of an underground sewer 12. The spraying apparatus has a rotary head 14, which spins as the apparatus progresses (in the direction of arrow 16), along the sewer, so that an even layer 18 of the order of several inches of fluent material composition builds up on the sewer wall. This composition subsequently forms the lining of the sewer, and may be a curable synthetic resin containing aggregate materials, or cement mortar as conventionally used for these linings, and it may include reinforcing fibres.

Following behind the spraying apparatus is an everting flexible tube 20, which has one end 21 at the remote left hand of the sewer anchored to a down pipe 22, and then a liquid 23 is used to evert the tube as shown in FIG. 1 along the inside of the lined passageway. The fluid pressure effect of the liquid is indicated by the arrows 24 in FIG. 1. The everting tube 20 should be applied to the applied composition 18 before it has had time to drop from the passageway surface (at least at the top) and on the other hand the composition should be as thixotropic as possible to allow sufficient time for the everting tube to be applied to the composition before it would normally fall from the passageway surface (at least at the top).

The down pipe 22 is an elbow pipe and is located in a manhole 26. The tube 20 feeds down the pipe 22 from a supply roll 28 located above ground and the liquid 23 is charged into pipe 22 from a supply 30 also at ground level, the liquid 23 serving to evert the tube 20 onto the lining 18.

The spraying apparatus 10 is winched along the passageway 12 by a winch motor 32 at ground level and by a winch rope 34 which passes down a manhole 36 at the bottom of which is a guide pulley 38.

The apparatus 10 may have a tank containing a sufficient supply of the material 18 to line a predetermined length or it may be supplied with the material, as shown in dotted lines in FIG. 1, from a supply tank 40 through pipe 42. Several tanks and pipes, such as tank 40 and pipe 42 may be required where the material is a multi-part resin system, the tanks and pipes respectively containing and carrying the respective parts of the system.

At the end of the lining operation, or at the end of a section of the lining operation, the lining tube 20 will have been completely everted, thereby trapping the fluent composition in its pasty state against the sewer wall.

This condition is maintained until the fluent composition has cured sufficiently to be free standing when the membrane 20 can be removed if desired, or if possible and the lining operation has been completed. If the hardenable composition is a thermosetting resin with additives, it may be that the membrane will be chosen so as to bind firmly to that composition whereby the membrane will provide smooth inner surface to the passageway.

The present invention provides a simple and effective method which is distinguished from the previously described method in that no felt or absorbent material is used and the membrane acts as a holding device.

I claim:

1. A method for lining a pipeline or passageway, such as an underground sewer, which includes the steps of:
   (a) spraying a hardenable thixotropic cementitious material radially outwardly and progressively along the interior of the pipeline or passageway until a lining of the desired thickness has been built up on the interior surface of the pipeline or passageway;
   (b) everting a flexible tubular membrane into said pipeline or passageway and progressively along the interior of said pipeline closely behind said newly applied cementitious material before said sprayed cementitious material has had an opportunity to flow into an undesirable pattern on the interior of said pipeline or passageway,
   (c) exerting a sufficient fluid pressure within the interior of said everted flexible tubular membrane so that said flexible tubular membrane will in turn exert a direct outward pressure against said cementitious lining that has been sprayed onto the interior of said pipeline, and
   (d) maintaining said fluid pressure and said direct pressure until said sprayed lining no longer has a tendency to flow.

2. A method according to claim 1 wherein said material comprises a synthetic resinous material.

3. A method according to claim 2 wherein said synthetic resinous material is admixed with aggregate.

4. A method according to claim 1 wherein said material comprises a cement mortar material.

5. A method according to any one of claims 1-4 wherein said material includes reinforcing fibers.

6. A method according to any one of claims 1-4 wherein said flexible tubular membrane is composed of plastics material.

7. A method according to any one of claims 1-4 wherein said material is sprayed by means of a rotating spray head.

* * * * *